Oct. 13, 1931.   E. C. CHATHAM   1,826,731
SPIRIT LEVEL
Filed May 17, 1930
Fig. 1.
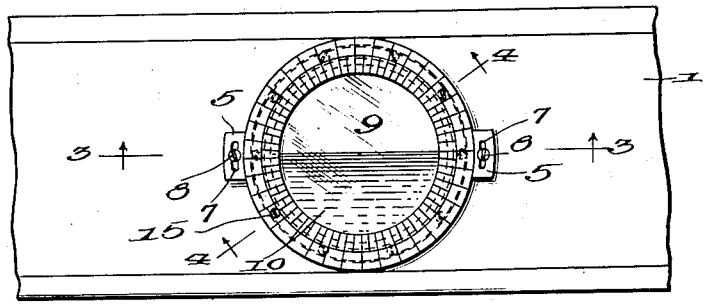
Fig. 2.
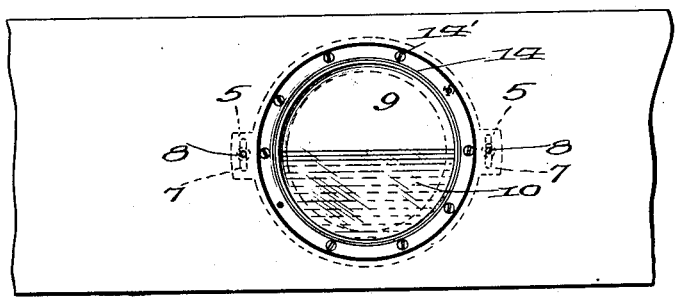
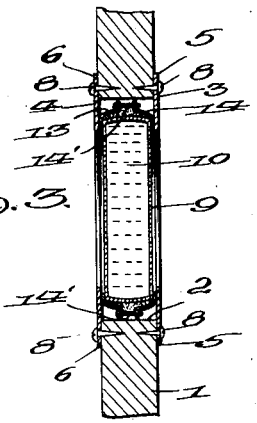
Fig. 3.
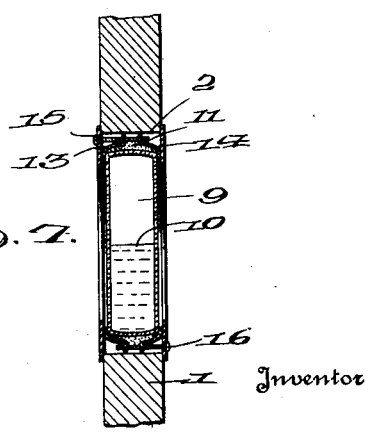
Fig. 4.
Inventor
Elisha C. Chatham,
By John B. ...
Attorney Patented Oct. 13, 1931

1,826,731

UNITED STATES PATENT OFFICE

ELISHA C. CHATHAM, OF TARRANT, ALABAMA

SPIRIT LEVEL

Application filed May 17, 1930. Serial No. 453,308.

This invention relates to an improvement in spirit levels.

An object of the invention is to provide a spirit level which is simple in construction and which may be easily assembled.

Another object of the invention is to provide a spirit level having a container composed entirely of glass and sealed by having the aperture through which the liquid is introduced closed by a fusing operation.

Another object of the invention is to provide a liquid level of the class described which is cheap to manufacture and not liable to get out of order.

Other objects of my invention will appear hereinafter throughout the specification.

In the accompanying drawings:—

Fig. 1 is a side elevation of one embodiment of my invention;

Fig. 2 is a view similar to Fig. 1 when one of the face plates is removed;

Fig. 3 is a section taken on the line 3—3 of Fig. 1, and;

Fig. 4 is a section taken on the line 4—4 of Fig. 1.

In the drawings similar reference figures refer to similar parts throughout the several drawings.

The numeral 1 indicates the stock of a spirit level which has a cylindrical cut out portion 2 extending through the stock, and partially covering the aperture 2 are plates 3 and 4 which have ears 5 and 6 respectively. The ears are provided with slots 7 in order that the plates may be adjustably held by screws 8.

A glass receptacle indicated by reference numeral 9 is provided and has within it preferably a non-freezing liquid 10. The liquid is sealed within the container 9 by fusing the glass and thereby closing the aperture through which the liquid is introduced. The peripheral portion of the container 9 is covered with a cushion of plaster of Paris 11, or other suitable material, which serves to take up any possible vacancy between the metallic rings 13 and 14, which clampingly engage the plaster of Paris covering and the edges or rim portions of the container 9. The plaster of Paris forms a cushion between the metallic rings 13 and 14 and the glass container and serves to absorb shocks which are transmitted to it from the stock. The rings 13 and 14 are attached to each other by a series of screws 14'.

The metallic rings 13 and 14 are non-rotatably held between the plates 3 and 4 by screws 15 and 16, respectively. Plates 3 and 4 are marked with degree graduations from 1° to 360°.

In assembling the device, the container 9 is filled one-half full of liquid, and sealed. Its periphery is then covered with a shock absorbing cushion of plaster of Paris or other suitable material, after which the metallic rings 13 and 14 are attached to each other by the screws 14'. Either the plate 3 or the plate 4 is next attached by screws 15 and 16 to the metallic rings 13 and 14, and the plate 3 or 4 adjustably attached to one face of the stock 1 by the screws 8. The other plate is now attached by screws 15 or 16 to the metallic rings 13 and 14 and this plate is then adjustably attached to the stock by the screws 8. It will be observed that it is necessary to loosen the four screws 8, two of which are on either side of the stock, in order to adjust the position of the liquid chamber, rings, and face plates, which are so connected to each other that they will all move as a unit.

It is to be understood that I desire not to be limited in the practice of my invention to the construction and arrangement of parts illustrated in the accompanying drawings, but desire to comprehend within the scope of my invention all embodiments as defined by the accompanying claims.

What I claim is:—

1. In a liquid level the combination of a stock having straight edges, there being an aperture in said stock, face plates on opposite sides of said aperture, a cylindrical sealed container containing a liquid, said container having a periphery, a plaster of Paris covering for said periphery, metallic rings surrounding said plaster of Paris and supporting said container, and means for connecting said rings to said plates.

2. In a liquid level the combination of a stock having straight edges, there being an aperture in said stock, face plates on opposite sides of said aperture, a cylindrical sealed container containing a liquid, said container having a periphery, a plaster of Paris covering for said periphery, metallic rings surrounding said plaster of Paris and supporting said container, and screws for connecting said rings to said plates.

3. In a level the combination of a stock having a circular aperture, plates on opposite sides of said aperture and having ears, said ears having slots therein, screws extending through said slots, a cylindrical sealed container containing a liquid, said container having a periphery, a plaster of Paris covering for said periphery, metallic rings surrounding said plaster of Paris and supporting said container, and means for connecting said rings to said plates.

4. In a level the combination of a stock having a circular aperture therethrough, circular face plates on opposite sides of said stock partially closing said apertures, a cylindrical container, metallic rings embracing said container, means for connecting said rings together, means for supporting said container and rings by said face plates, and means adjustably arranged on either face of said stock whereby the position of said container, rings and plates as a unit may be adjusted.

5. In a level in combination, a stock, said stock having an aperture, a sealed glass container adapted to be located in said aperture, said container having a periphery, plates embracing said periphery and connected together, shock absorbing material between said plates and the periphery of said container, a plate attached to one face of said stock and screws for attaching said rings to said plate.

6. In a level in combination, a stock, said stock having an aperture, a sealed glass container adapted to be located in said aperture, said container having a periphery, plates embracing said periphery and connected together, shock absorbing material located between said plates and the periphery of said container, a plate adjustably attached to one face of said stock and means for attaching said rings to said plate.

In testimony whereof I have hereunto set my hand this 19th day of April, A. D. 1930.

ELISHA C. CHATHAM.